United States Patent
Ryu et al.

(10) Patent No.: US 9,786,903 B2
(45) Date of Patent: Oct. 10, 2017

(54) POSITIVE ELECTRODE ACTIVE MATERIAL FOR LITHIUM SECONDARY BATTERY, METHOD OF PREPARING THE SAME AND LITHIUM SECONDARY BATTERY INCLUDING THE SAME

(71) Applicant: LG Chem, Ltd., Seoul (KR)

(72) Inventors: Ji Hoon Ryu, Daejeon (KR); Chi Ho Jo, Daejeon (KR); Min Suk Kang, Daejeon (KR); Sun Sik Shin, Daejeon (KR); Wang Mo Jung, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/515,078

(22) PCT Filed: Oct. 2, 2015

(86) PCT No.: PCT/KR2015/010445
§ 371 (c)(1),
(2) Date: Mar. 28, 2017

(87) PCT Pub. No.: WO2016/053051
PCT Pub. Date: Apr. 7, 2016

(65) Prior Publication Data
US 2017/0222211 A1    Aug. 3, 2017

(30) Foreign Application Priority Data

Oct. 2, 2014  (KR) .................. 10-2014-0133383
Oct. 1, 2015  (KR) .................. 10-2015-0138716

(51) Int. Cl.
*H01M 4/58*   (2010.01)
*H01M 4/131*  (2010.01)
(Continued)

(52) U.S. Cl.
CPC .......... *H01M 4/131* (2013.01); *H01M 4/362* (2013.01); *H01M 4/483* (2013.01); *H01M 4/502* (2013.01);
(Continued)

(58) Field of Classification Search
CPC ...... H01M 4/131; H01M 4/362; H01M 4/483; H01M 4/502; H01M 4/523; H01M 10/0525; H01M 2004/021
See application file for complete search history.

(56) References Cited

U.S. PATENT DOCUMENTS 7,883,644 B2    2/2011  Paulsen et al.
2002/0076613 A1 6/2002  Lee et al.
(Continued)

FOREIGN PATENT DOCUMENTS

CN    102623694 A    8/2012
EP    2395581 A1     12/2011
(Continued)

OTHER PUBLICATIONS

International Search report for PCT/KR2015/010445 dated Jan. 14, 2016.
(Continued)

*Primary Examiner* — Raymond Alejandro
(74) *Attorney, Agent, or Firm* — Lerner, David, Littenberg, Krumholz & Mentlik, LLP

(57) ABSTRACT

The present invention provides a positive electrode active material for a lithium secondary battery including a core including first lithium cobalt oxide, and a surface modifying layer positioned on a surface of the core. The surface modifying layer includes a lithium compound discontinuously distributed on the surface of the core, and second lithium cobalt oxide distributed while making a contact with or adjacent to the lithium compound, with a Li/Co molar
(Continued)

ratio of less than 1. The positive electrode active material according to the present invention forms a lithium deficient structure in the positive electrode active material of lithium cobalt oxide and changes two-dimensional lithium transport path into three-dimensional path. The transport rate of lithium ions may increase when applied to a battery, thereby illustrating improved capacity and rate characteristic without decreasing initial capacity.

17 Claims, 4 Drawing Sheets

(51) Int. Cl.
  *H01M 4/36* (2006.01)
  *H01M 4/48* (2010.01)
  *H01M 4/50* (2010.01)
  *H01M 4/52* (2010.01)
  *H01M 10/0525* (2010.01)
  *H01M 4/02* (2006.01)

(52) U.S. Cl.
  CPC ....... *H01M 4/523* (2013.01); *H01M 10/0525* (2013.01); *H01M 2004/021* (2013.01)

(56) References Cited

U.S. PATENT DOCUMENTS

| | | |
|---|---|---|
| 2004/0200998 A1 | 10/2004 | Park et al. |
| 2006/0063070 A1 | 3/2006 | Chiga et al. |
| 2010/0216030 A1 | 8/2010 | Maeda |
| 2010/0285366 A1* | 11/2010 | Endoh ............... H01M 4/13 429/231.95 |
| 2011/0059367 A1 | 3/2011 | Morita et al. |
| 2012/0225351 A1* | 9/2012 | Kojima ............... H01M 4/0404 429/211 |
| 2013/0260258 A1* | 10/2013 | Tsuchida ............ H01M 4/131 429/304 |
| 2014/0045067 A1 | 2/2014 | Cho et al. |
| 2014/0212745 A1 | 7/2014 | Kim et al. |

FOREIGN PATENT DOCUMENTS

| | | |
|---|---|---|
| JP | 2000164214 A | 6/2000 |
| JP | 2013054926 A | 3/2013 |
| KR | 20030083476 A | 10/2003 |
| KR | 20070095200 A | 9/2007 |
| KR | 20110035003 A | 4/2011 |
| KR | 20110079025 A | 7/2011 |
| KR | 20120121235 A | 11/2012 |
| KR | 20140067508 A | 6/2014 |
| KR | 20140095810 A | 8/2014 |

OTHER PUBLICATIONS

Written Opinion of the International Searching Authority for PCT/KR2015/010445, dated Jan. 14, 2016.
European Search Report for Application No. EP15847484 dated Jun. 27, 2017.
J. Cho et al: "Enhancement of Thermal Stability of LIC002 by LIMN204 Coating", Electrochemical and Solid-State Letters, vol. 2, No. 6, Mar. 16, 1999 (Mar. 16, 1999), pp. 53-255.

* cited by examiner

POSITIVE ELECTRODE ACTIVE MATERIAL FOR LITHIUM SECONDARY BATTERY, METHOD OF PREPARING THE SAME AND LITHIUM SECONDARY BATTERY INCLUDING THE SAME

CROSS-REFERENCE TO RELATED APPLICATIONS

The present application is a national phase entry under 35 U.S.C. §371 of International Application No. PCT/KR2015/010445, filed Oct. 2, 2015, which claims priority to Korean Patent Application No. 2014-0133383, filed on Oct. 2, 2014, and Korean Patent Application No. 2015-0138716, filed on Oct.1, 2015, the entire contents of which are incorporated herein by reference.

TECHNICAL FIELD

The present invention relates to a positive electrode active material for a lithium secondary battery, a method of preparing the same, and a lithium secondary battery including the same.

BACKGROUND ART

As technical developments and demands on mobile devices are increasing, demands on secondary batteries as an energy source is being rapidly increasing. Among the secondary batteries, lithium secondary batteries having high energy density and voltage, long cycle life, and low discharge rate are commercialized and widely used.

However, the lithium secondary battery has a limitation that the life thereof decreases rapidly via repeating charge and discharge. Particularly, the limitation is more serious at high temperatures. The reason is that an electrolyte may be decomposed due to water in the battery or other factors, an active material may be deteriorated, or the internal resistance of the battery may increase.

A positive electrode active material for a lithium secondary battery, which is being actively researched, developed and used, is $LiCoO_2$ with a layered structure. $LiCoO_2$ may be easily synthesized and has good electrochemical properties including life property, and is the most widely used material. However $LiCoO_2$ has low structural stability, and the application thereof to a battery with high capacity is limited.

As the substituents of the positive electrode active material, various lithium transition metal oxides such as $LiNiO_2$, $LiMnO_2$, $LiMn_2O_4$, or $LiFePO_4$ have been developed. $LiNiO_2$ has merits of providing the battery properties of high discharge capacity, however is hardly synthesized by a simple solid phase reaction and has low thermal stability and cycle property. In addition, lithium manganese oxides such as $LiMnO_2$ or $LiMn_2O_4$ have merits of good thermal stability and low cost, however have limitations of a small capacity and inferior properties at high temperatures. Particularly, for $LiMn_2O_4$, some products are commercialized at low cost; however the life property thereof is not good due to Jahn-Teller distortion owing to $Mn^{3+}$. Since $LiFePO_4$ is inexpensive and safe, a lot of research is being conducted for the use in a hybrid electric vehicle (HEV), however the application thereof to another fields is hard due to low conductivity.

Due to such circumstances, a lithium nickel manganese cobalt oxide, $Li(Ni_xCo_yMn_z)O_2$ (where x, y, and z are atomic partial ratios of independent oxide composite elements and satisfy $0<x\le1$, $0<y\le1$, $0<z\le1$, and $0<x+y+z\le1$), receives much attention as the substituting positive electrode active material of $LiCoO_2$. This material is cheaper than $LiCoO_2$ and has merits of being used under a high capacity and a high voltage. However, the material has demerits of not providing good rate characteristic and life property at high temperatures. In order to increase the structural stability of the lithium nickel manganese cobalt oxide, the amount of Li relative to the amount of a transition metal included in the oxide is increased.

Recently, as the size of portable devices such as mobile phones and tablet computers is gradually miniaturized, batteries applied thereto are also required to be miniaturized together with high capacity and energy. In order to increase the energy per unit volume of a battery, the packing density of an active material or a voltage is required to be increased. In order to increase the packing density, active materials having a large size are preferable. However, the active materials having a large size have a relatively small surface area, and thus, an active area making contact with an electrolyte may be also narrow. The narrow active area may be kinetically unfavorable, and relatively low rate characteristic and initial capacity may be attained.

DISCLOSURE OF THE INVENTION

Technical Problem

According to first aspect of the present invention, there is provided a positive electrode active material for a lithium secondary battery of which output property, capacity property, and rate characteristic may be improved by increasing the transport rate of lithium ions via the conversion of the two-dimensional transport path of lithium into a three-dimensional path in the surface of a lithium cobalt oxide based positive electrode active material.

According to second aspect of the present invention, there is provided a method of preparing the positive electrode active material.

According to a third aspect of the present invention, there is provided a positive electrode including the positive electrode active material.

According to a fourth aspect of the present invention, there is provided a lithium secondary battery, a battery module, and a battery pack including the positive electrode.

Technical Solution

To overcome such above limitations, according to an embodiment of the present invention provides a positive electrode active material for a lithium secondary battery including a core including a first lithium cobalt oxide, and a surface modifying layer positioned on a surface of the core, in which the surface modifying layer includes a lithium compound discontinuously distributed on the surface of the core, and a second lithium cobalt oxide distributed while making a contact with or adjacent to the lithium compound, with a Li/Co molar ratio of less than 1, and the lithium compound includes at least one lithium reactive element selected from the group consisting of Ti, W, Zr, Mn, Mg, P, Ni, Al, Sn, V, Cr, and Mo.

According to another embodiment of the present invention, there is provided a method of preparing a positive electrode active material for a lithium secondary battery including preparing a first lithium cobalt oxide by mixing a cobalt raw material and a lithium raw material in amounts satisfying a relation of 1≤Li/Co molar ratio, and first heating; and mixing the lithium cobalt oxide with a surface treating agent including a lithium reactive element, and second heating, in which the lithium reactive element includes at least one selected from the group consisting of Ti, W, Zr, Mn, Mg, P, Ni, Al, Sn, V, Cr, and Mo.

According to a further another embodiment of the present invention, there is provided a positive electrode including the positive electrode active material.

Furthermore according to a further another embodiment of the present invention, there is provided a lithium secondary battery, a battery module and a battery pack including the positive electrode.

Particulars of exemplary embodiments of the present invention will be included in the following detailed explanation.

Effects of the Invention

In the positive electrode active material for a lithium secondary battery according to the present invention, a lithium deficient structure may be formed on the surface of a core including lithium cobalt oxide, and a two-dimensional lithium transport path may be converted into a three-dimensional path in the surface of the positive electrode active material, thereby improving the transport rate of lithium ions, improving rate characteristic when applied to a battery, and improving capacity property without worrying about the deterioration of an initial capacity due to the decrease of resistance at the surface of the active material. Further, good life property may be realized even with large-sized particles, and at the same time, the energy density of a battery may be improved because of the increase of positive electrode density. Therefore, the positive electrode active material for a lithium secondary battery according to the present invention may be readily applied as the positive electrode active material of a battery for a high voltage of 4.4 V or more.

BRIEF DESCRIPTION OF THE DRAWINGS

The accompanying drawings in the present disclosure illustrate preferred embodiments of the present invention, and serve to further understanding of the principles of the present invention together with the description. The present invention should not be construed as limited to the description in the drawings.

BEST MODE FOR CARRYING OUT THE INVENTION

Figure 1:
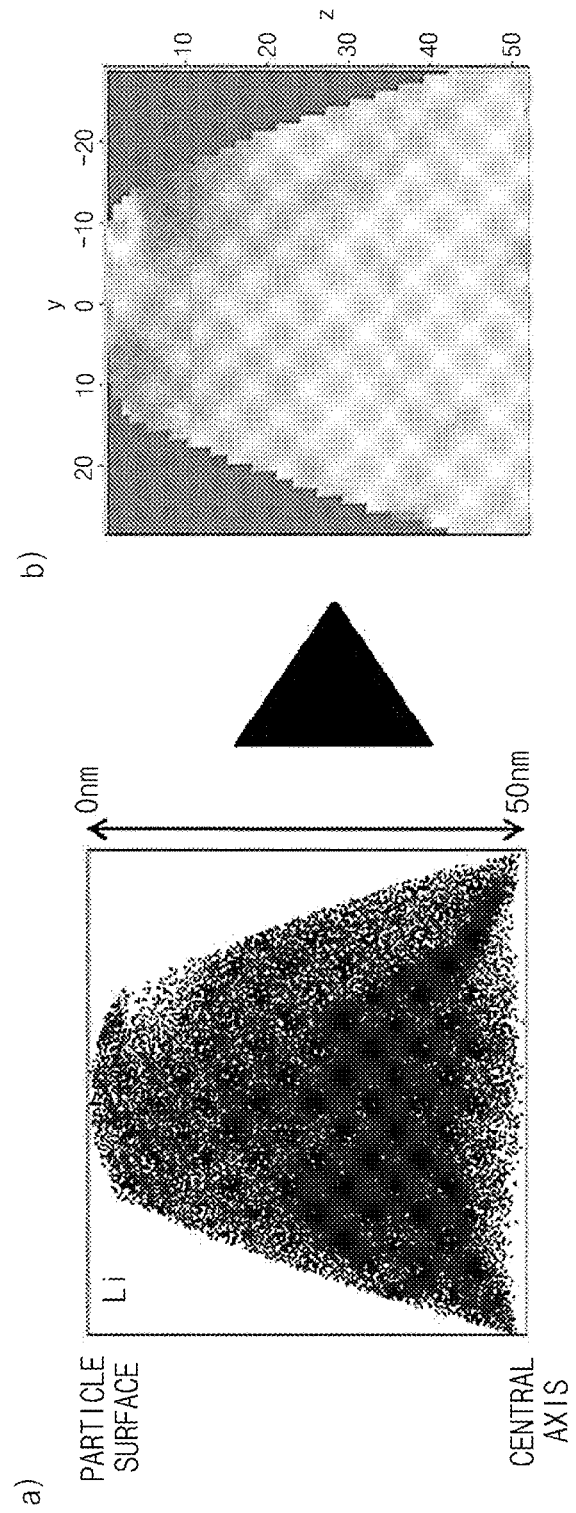
FIG. 1 illustrates photographic images for observing lithium distribution in the surface side of a particle in a lithium cobalt oxide particle prepared in Preparation Example 1 using an atom probe tomography (APT)

Hereinafter, the present invention will be explained in more detail to assist the understanding of the present invention.

It will be further understood that terms or words used in the description and claims should not be interpreted as having a meaning such as those used in common or defined in dictionaries, however should be interpreted as having a meaning and concept that is consistent with the technical spirit of the present invention on the basis of a principle that an inventor may define the concept of terms appropriately to explain his invention by the best way.

The positive electrode active material for a lithium secondary battery according to an embodiment of the present invention includes a core including first lithium cobalt oxide; and a surface modifying layer positioned on a surface of the core.

The surface modifying layer includes a lithium compound discontinuously distributed on the surface of the core; and second lithium cobalt oxide distributed while making a contact with or adjacent to the lithium compound, with a Li/Co molar ratio of less than 1.

The lithium compound includes at least one reactive element with lithium selected from the group consisting of Ti, W, Zr, Mn, Mg, P, Ni, Al, Sn, V, Cr, and Mo.

In the present invention, the expression of lithium compound "discontinuously distributed" means that a region where a lithium compound is present and a region where a lithium compound is not present are included in a specific region, and the region where the lithium compound is not present is formed as an island shape so as to isolate, insulate, or separate the region where the lithium compound is present. Accordingly, the region where the lithium compound is present is distributed discontinuously.

In the positive electrode active material for a lithium secondary battery according to an embodiment of the present invention, a core includes lithium cobalt oxide (Hereinafter will be referred to as "first lithium cobalt oxide").

The first lithium cobalt oxide may be any material that may conduct the intercalation and deintercalation of lithium ions and may be a commonly used positive electrode active material for a lithium secondary battery, without specific limitation. Particularly, the first lithium cobalt oxide may include a compound of the following Formula 1.

$$Li_aCoM_xO_2 \qquad \text{[Formula 1]}$$

(In Formula 1, M is a doping element and includes at least one metal element selected from the group consisting of W, Mo, Zr, Ti, Mg, Ta, Al, Fe, V, Cr, and Nb, and a and x are atomic fractions of each independent component of the oxide and satisfy the following relations of $1 \le a \le 1.2$, and $0 \le x \le 0.02$.)

In addition, the first lithium cobalt oxide may have a layered crystal structure.

In the positive electrode active material according to an embodiment of the present invention, the structural stability of the active material, particularly, the structural stability at high temperatures may be improved, and the deterioration of capacity at high temperatures may be prevented by including lithium rich lithium cobalt oxide having a Li/Co ratio of 1 or more in the active material particle, that is, in the core.

In the core, a lithium element may be distributed in the core with a single concentration value, or with a gradually increasing concentration gradient from the interface of the core and the surface modifying layer to the center of the core. If the lithium element is distributed with a concentration gradient, in Formula 1, a may increase toward the center of the core within a range of $1 \le a \le 1.2$.

In addition, in Formula 1, M may be included in an amount of x satisfying the relation of $0 \le x \le 0.02$ in the first lithium cobalt oxide. In the case where the metal element as described above is doped further in the first lithium cobalt oxide, the structural stability of the positive electrode active material may be improved, and as a result, the output property of a battery may be improved. In addition, by doping the metal element in the above-described amount, the improving effects thereof may be further increased.

Meanwhile, in the positive electrode active material for a lithium secondary battery according to an embodiment of the present invention, the surface modifying layer positioned on the surface of the core may be formed by mixing a surface treating agent including an element having good reactivity with lithium, that is, a lithium reactive element, and first lithium cobalt oxide particles, and heating, and may include a lithium compound produced via the reaction of the lithium reactive element in the surface treating agent with the lithium of the first lithium cobalt oxide present in the surface side of the first lithium cobalt oxide particles; and second lithium cobalt oxide having a lithium deficient structure by providing lithium during the reaction.

The production reaction of the lithium compound is not generated for the whole lithium present in the surface side of the first lithium cobalt oxide particles but is generated partially, and the lithium compound present in the surface modifying layer may be discontinuously distributed, and more particularly, may be distributed in an island shape.

In addition, around the lithium compound, lithium deficient second lithium cobalt oxide is present via contact with or adjacent to the lithium compound. The closer to the lithium compound, the increase the density of the second lithium cobalt oxide.

More particularly, the lithium deficient second lithium cobalt oxide may have a Li/Co molar ratio of less than 1, and more particularly, within a range from 0.95 to 0.99.

Different from a common lithium cobalt oxide having a layered crystal structure, the lithium deficient second lithium cobalt oxide has a cubic crystal structure, which is belongs to an Fd-3m space group and has a lattice constant (a0) from 7.992 to 7.994 (25° C.). The crystal structure is similar to a spinel crystal structure, and three-dimensional transport of lithium ions may be possible like in the spinel crystal structure. Accordingly, the transport of the lithium ions may be easy, and the rate may be high when compared to a layered structure in which two-dimensional transport of lithium ions may be possible. As a result, the intercalation and deintercalation of lithium ions may be easy.

In addition, the rate characteristic of the positive electrode active material is dependent on the interface reaction rate between a positive electrode active material and an electrolyte. In the positive electrode active material according to an embodiment of the present invention, improved rate characteristic may be obtained due to rapid transport rate of lithium in the surface of the core through forming a lithium deficient structure, that is, a spinel-like structure in the surface of a core including lithium cobalt oxide allowing three-dimensional transport of lithium. In addition, since resistance at the surface of the core is small, improved capacity property may be obtained. Particularly, in the case where the positive electrode active material has large-sized particles, the life property of a battery may increase, and the energy density of a battery may be improved due to increasing the density of a positive electrode.

In the present invention, the crystal structure of the lithium cobalt oxide in the positive electrode active material may be identified by common identification methods of a crystal structure, and may particularly be identified using a transmission electron microscope.

More particularly, the lithium deficient second lithium cobalt oxide may include a compound represented by the following Formula 2.

 [Formula 2]

(In Formula 2, b, and y are atomic fractions of independent components of the oxide and satisfy the following relations of 0<b≤0.05, and 0≤y≤0.02, and M' is a doping element and includes at least one metal element selected from the group consisting of W, Mo, Zr, Ti, Mg, Ta, Al, Fe, V, Cr, Ba, Ca, and Nb.)

In Formula 2, M' may be included in an amount of y in the second lithium cobalt oxide, that is, in an amount satisfying the relation of 0≤y≤0.02. If the metal element is further doped in the lithium deficient second lithium cobalt oxide, structural stability may be improved, and there would be no more worrying about the deterioration of the structural stability of the positive electrode active material including a deficient structure, and the output property of a battery may be improved. In addition, by doping the above-described amount, improving effects thereof may be further improved.

Meanwhile, the lithium compound produced via the reaction of the surface treating agent with the lithium in the lithium cobalt oxide may be lithium oxide including at least one lithium reactive element selected from the group consisting of W, Mo, Zr, Ti, Mg, Ta, Al, Fe, V, Cr, Ba, Ca, and Nb. Among the compounds, the lithium compound may be lithium oxide including at least one lithium reactive element selected from the group consisting of Ti, P, Mn, and Al, having good reactivity with lithium and good producing effect of the lithium deficient structure. More particularly, the lithium oxide may be at least one selected from the group consisting of $Li_2TiO_3$, $Li_4Ti_5O_{12}$, $Li_3PO_4$, $Li_2MnO_3$, $LiMn_2O_4$, and $LiAlO_2$, or a mixture of two or more thereof.

The lithium compound is present discontinuously on the surface of the lithium cobalt oxide and may form a rapid path of lithium ions. However, if the amount is excessively large, the resistance in the surface modifying layer may be rather increased.

Therefore, in the positive electrode active material for a lithium secondary battery according to an embodiment of the present invention, the lithium compound may be included in an amount ratio such that the lithium reactive element may be included in an amount ratio from 50 to 50,000 ppm relative to the total weight of the positive electrode active material. If the amount of the lithium reactive element is less than 50 ppm, the generation ratio of the lithium deficient structure in the surface modifying layer may be low, and the increasing effect of the transport rate of lithium may be trivial, and if the amount is greater than 50,000 ppm, the production amount of the lithium compound produced via the reaction with lithium may be excessively increase, and the resistance in the surface modifying layer may increase.

In addition, in the positive electrode active material for a lithium secondary battery according to the present invention, the core may include lithium with higher concentration than the surface modifying layer. The lithium may be distributed in each region of the core and the surface modifying layer with uniform concentration or with a gradually increasing concentration gradient from the interface of the core and the surface modifying layer to the center of the core as described above.

As described above, the positive electrode active material according to an embodiment of the present invention includes, concerning the transport of the lithium ions, lithium cobalt oxide having a deficient structure allowing the three-dimensional transport of lithium ions in the surface side of the active material particle, that is, in the surface modifying layer, and the transport of lithium may become easy, the initial internal resistance of a lithium secondary battery may decrease, and the rate characteristic of a battery may be improved. In addition, by including lithium rich lithium cobalt oxide having a Li/Co ratio of 1 or more in the active material particle, that is, in the core, the structural stability of an active material, particularly, the structural stability at high temperatures may be improved, and the deterioration of capacity at high temperatures may be prevented. Such effects may be more effective for a positive electrode active material with large-sized particles.

Meanwhile, in the present invention, the concentration change of the lithium in the positive electrode active material may be measured by a common method, and the concentration of the lithium and other elements present in the surface may be measure by using an X-ray photoelectron spectroscopy (XPS), a transmission electron microscopy (TEM), or an energy dispersive x-ray spectroscopy (EDS). The lithium amount in the lithium cobalt oxide may be measured by using an inductively coupled plasma-atomic emission spectrometer (ICP-AES), and the shape of the lithium cobalt oxide may be identified using a time of flight secondary ion mass spectrometry (ToF-SIMS).

In addition, in the positive electrode active material according to an embodiment of the present invention, the core and the surface modifying layer may have a thickness ratio from 1:0.01 to 1:0.1. In the case where the thickness of the core, that is, the radius deviates from above range of thickness ratio and is excessively thick, the increasing effect of the mobility of lithium ions according to the formation of the surface modifying layer including the lithium deficient lithium cobalt oxide and the resultant improving effect of battery properties may be trivial, and in the case where the thickness of the surface modifying layer deviates the upper limit and is excessively large, the core may be relatively decreased, and the structural stabilizing effect in the active material particle may be trivial. More particularly, under the conditions of the above thickness ratio, the thickness of the surface modifying layer may be from 1 to 100 nm, or from 10 to 50 nm.

The positive electrode active material according to an embodiment of the present invention has a monolith structure formed from the first particles of the lithium cobalt oxide with the surface modifying layer.

In the present invention, a "monolith structure" means a structure present in an independent phase in which particles have a morphology phase and are not agglomerated each other. A particle structure in contrast to the monolith structure may include a structure forming a relatively large-sized particle shape (second particles) via physical and/or chemical agglomeration of relatively small-sized particles (first particles).

Generally, the size of the particles of the positive electrode active material is preferably large for attaining a high capacity of a battery, however in this case, the surface area is relatively small, and the active area making a contact with an electrolyte decreases, thereby deteriorating rate characteristic and an initial capacity. In order to solve the defects, a positive electrode active material of a second particle phase obtained by assembling the first particles of fine particles are mainly used. However, in the positive electrode active material with the granulated second particles, lithium ions may react with moisture or $CO_2$ in the air to easily form surface impurities such as $Li_2CO_3$ and LiOH while moving toward the surface of the active material, and the surface impurities thus formed may reduce the capacity of a battery or may be decomposed and generate gas in the battery, thereby generating the swelling of the battery. Therefore, the stability at high temperatures may become serious. However, the lithium cobalt oxide particles forming the positive electrode active material according to an embodiment of the present invention have the monolith structure, and there would be no worries on the generation of the defects of the positive electrode active material having the secondary particle phase.

Further, the positive electrode active material particles having the monolith structure may have an average particle diameter ($D_{50}$) from 3 μm to 50 μm in consideration of the specific surface area and the density of a positive electrode mixture and may have a greater average particle diameter ($D_{50}$) from 10 μm to 50 μm due to the structural characteristic enabling the easy intercalation and deintercalation of lithium ions when compared to a common positive electrode active material.

In the present invention, the average particle diameter ($D_{50}$) of the positive electrode active material may be defined by the particle diameter on the basis of the particle diameter at 50% distribution. In addition, the average particle diameter ($D_{50}$) of the positive electrode active material may be measured using, for example, a laser diffraction method, and particularly, by dispersing the positive electrode active material particle in a dispersion medium, introducing thereof to a commercially available laser diffraction particle size measuring apparatus (for example, Microtrac MT 3000), irradiating ultrasonic waves of about 28 kHz with the output of 60 W, and computing the average particle diameter ($D_{50}$) on the basis of the particle diameter at 50% distribution in the measuring apparatus.

In addition, in the positive electrode active material particles according to an embodiment of the present invention, an inflection point is observed between a voltage range from 4.0 V to 4.2 V due to the lithium deficient lithium cobalt oxide included in particle when measuring a voltage profile when charging and discharging.

The positive electrode active material having the above-described structure according to an embodiment of the present invention may be prepared by a method including a step of preparing a first lithium cobalt oxide by mixing a cobalt raw material and a lithium raw material in amounts satisfying the relation of 1≤Li/Co molar ratio, and first heating, and a step of mixing the lithium cobalt oxide with a surface treating agent including a lithium reactive element and second heating. According to another embodiment of the present invention, a method of preparing the positive electrode active material for a lithium secondary battery is provided.

In more detail, Step 1 is a step for preparing the first lithium cobalt oxide.

The first lithium cobalt particle is the same as described above, and may be prepared by mixing the cobalt raw material and the lithium raw material in amounts such that a Li/Co molar ratio satisfies the relation of 1≤Li/Co molar ratio, and first heating.

In this case, the cobalt raw material may particularly be a cobalt-containing oxide, hydroxide, oxyhydroxide, halogenide, nitrate, carbonate, acetate, oxalate, citrate, or sulfate, and may more particularly be $Co(OH)_2$, CoO, CoOOH, $Co(OCOCH_3)_2 \cdot 4H_2O$, $Co(NO_3)_2 \cdot 6H_2O$, or $Co(SO_4)_2 \cdot 7H_2O$, or may use any one or a mixture of two or more thereof.

The lithium raw material may particularly be a lithium-containing oxide, hydroxide, oxyhydroxide, halogenide, nitrate, carbonate, acetate, oxalate, citrate, or sulfate, and may more particularly be $Li_2CO_3$, $LiNO_3$, $LiNO_2$, LiOH, $LiOH.H_2O$, LiH, LiF, LiCl, LiBr, LiI, $Li_2O$, $Li_2SO_4$, $CH_3COOLi$, or $Li_3C_6H_5O_7$, or may use any one or a mixture of two or more thereof.

The cobalt raw material and the lithium raw material may be mixed in amounts such that a Li/Co molar ratio satisfies the relation of 1≤Li/Co molar ratio. With the above mixing amount range, a core part including first lithium cobalt oxide having a layered structure may be formed.

More particularly, in consideration of remarkable improving effect, the cobalt raw material and the lithium raw material may be mixed in amounts such that a Li/Co molar ratio satisfies the relation of 1≤Li/Co molar ratio≤1.2.

In the case where the first lithium cobalt oxide thus prepared is doped, the raw material of a metal element (M) for doping may be selectively added further during mixing the cobalt raw material and the lithium raw material.

The raw material of the metal element (M) for doping may particularly be at least one metal selected from the group consisting of W, Mo, Zr, Ti, Mg, Ta, Al, Fe, V, Cr, and Nb, or an oxide, a hydroxide, an oxyhydroxide, a halogenide, a nitrate, a carbonate, an acetate, an oxalate, a citrate, or a sulfate including thereof, or a mixture of two or more thereof may be used.

The first heating of the mixture of the raw materials may be conducted at a temperature from 750° C. to 900° C. If the first heating temperature is less than 750° C., an unreacted raw material may remain, and discharge capacity, cycle property and an operation voltage per unit weight may be deteriorated. If the first heating temperature is more than 900° C., by-products may be produced, and discharge capacity, cycle property and an operation voltage per unit weight may be deteriorated.

In addition, the first heating may be conducted in the air or under an oxygen atmosphere for 2 to 30 hours for sufficient diffusion reaction between particles of the mixture.

Then, Step 2 is a step for forming a surface modifying layer on the surface of the core by mixing the core prepared in Step 1 with a surface treating agent, and second heating.

The surface treating agent may be a lithium reactive element, particularly, at least one selected from the group consisting of Ti, W, Zr, Mn, Mg, P, Ni, Al, Sn, V, Cr, and Mo, a powder group or a compound including two or more thereof, or a mixture of two or more thereof.

In the surface treating agent, a compound including the lithium reactive element may be an oxide, a hydroxide, an oxyhydroxide, a halogenide, a nitrate, a carbonate, an acetate, an oxalate, a citrate, or a sulfate including the element, or a mixture of two or more thereof.

In addition, the surface treating agent may be used in an amount such that the lithium reactive element may be included in an amount ratio from 50 to 50,000 ppm relative to the total amount of the positive electrode active material. More particularly, the surface treating agent may be used in an amount ratio from 0.01 to 0.5 parts by weight, and more particularly, from 0.04 to 0.3 parts by weight relative to 100 parts by weight of the first lithium cobalt oxide.

In addition, the second heating for the mixture of the core and the surface treating agent may be conducted at a temperature from 400° C. to 1,100° C. If the second heating temperature is less than 400° C., unreacted raw materials may remain, and discharge capacity, cycle property and an operation voltage per unit weight may be deteriorated, and if the second heating temperature is more than 1,100° C., by-products may be produced, and discharge capacity, cycle property and an operation voltage per unit weight may be deteriorated.

In addition, the second heating may be conducted in the air or under an oxygen atmosphere for 5 to 30 hours for sufficient diffusion reaction between particles of the mixture.

The preparation method of the positive electrode active material according to an embodiment of the present invention is a dry method not using a solvent.

Generally, in a wet method using a solvent for preparing a positive electrode active material and for surface treating process, a metal precursor is used after dissolving in a solvent, and the pH change of the solvent may be easy, and the size of the positive electrode active material finally prepared may be easily changed, or particle cleavage may be induced. In addition, Li ions may be eluted from the surface of the positive electrode active material including Li, and various oxides may be formed as by-products at the surface. On the contrary, in the case where the positive electrode active material is prepared by the dry method in the present invention, the above problem due to the use of the solvent may not be generated, and the preparation efficiency and the process availability of the active material may be good. In addition, according to the surface treatment by the dry method, a binder is not used, and by-products due to the use of the binder may not be generated.

Since the positive electrode active material prepared by the above-described preparation method includes a surface modifying layer including lithium cobalt oxide having a lithium deficient structure having a three-dimensional transport path allowing easy lithium transport, on the surface of the core of the lithium cobalt oxide having a monolith structure, lithium transport rate may be increased, and good high voltage property may be obtained without worrying on low rate characteristic and the deterioration of initial capacity property even with large-sized particles.

According to another embodiment of the present invention, a positive electrode and a lithium secondary battery including the above-described positive electrode active material are provided.

Particularly, the positive electrode may include a positive electrode current collector, and a positive electrode active material layer formed on the positive electrode current collector and including the positive electrode active material.

The positive electrode current collector may use any material that may not induce the chemical change of a battery and have conductivity, without specific limitation, and may include, for example, stainless steel, aluminum, nickel, titanium, baked carbon, or a surface treated material of surface of aluminum or stainless steel with carbon, nickel, titanium, silver, etc. Generally, the positive electrode current collector may have a thickness from 3 to 500 μm, and the adhesiveness of the positive electrode active material may be increased by forming fine convexo-concave on the surface of the current collector. For example, various shapes including a film, a sheet, a foil, a net, a porous body, a foamed body, a non-woven fabric body, etc. may be used.

Meanwhile, the positive electrode active material layer may include a conductive material and a binder together with the positive electrode active material. In this case, the positive electrode active material may be the same as those described above.

The conductive material is used to impart an electrode with conductivity, and any material that may not induce chemical change in a battery and have electron conductivity may be used, without specific limitation. Particular example may include graphite such as natural graphite or artificial graphite; a carbon-based material such as carbon black, acetylene black, ketchen black, channel black, furnace black, lamp black, thermal black, and carbon fibers; a metal powder or a metal fiber of copper, nickel, aluminum, silver, or the like; conductive whisker such as zinc oxide, and potassium titanate; a conductive metal oxide such as titanium oxide; or a conductive polymer such as polyphenylene derivatives, and the material may be used alone or as a mixture of two or more. Generally, the conductive material may be included in an amount ratio from 1 to 30 wt % relative to the total weight of the positive electrode active material layer.

The binder plays the role of improving adhesiveness between the positive electrode active material particles, and between the positive electrode active material and the current collector. Particularly, polyvinylidene fluoride (PVDF), vinylidenefluoride-hexafluoropropylene copolymer (PVDF-co-HFP), polyvinyl alcohol, polyacrylonitrile, carboxymethyl cellulose (CMC), starch, hydroxypropyl cellulose, regenerated cellulose, polyvinyl pyrrolidone, tetrafluoroethylene, polyethylene, polypropylene, ethylene-propylene-diene polymer (EPDM), sulfonated-EPDM, a styrene butadiene rubber (SBR), a fluorine rubber, or diverse copolymers thereof may be used, and the material may be used alone or as a mixture of two or more. The binder may be included in an amount ratio from 1 to 30 wt % relative to the total weight of the positive electrode active material layer.

The positive electrode having the above-described structure may be manufactured by a common method of manufacturing a positive electrode except for using the above-described positive electrode active material. Particularly, a composition for forming a positive electrode active material layer obtained by dissolving and dispersing the positive electrode active material, the binder, and the conductive material in a solvent may be applied on the positive electrode current collector, dried, and rolled to manufacture the positive electrode active material layer. In this case, the kind and the amount of the positive electrode active material, the binder, and the conductive material are the same as those described above.

In addition, the solvent may be a commonly used solvent in the art and may be dimethyl sulfoxide (DMSO), isopropyl alcohol, N-methylpyrrolidone (NMP), acetone, or water, and the solvent may be used alone or as a mixture of two or more. The amount used of the solvent may be sufficient if the composition has a viscosity capable of forming good thickness uniformity during applying for manufacturing a positive electrode after dissolving or dispersing the positive electrode active material, the conductive material, and the binder therein, in consideration of the applying thickness of a slurry and a production yield.

According to another method, the positive electrode may be manufactured by laminating a film obtained by casting the composition of the positive electrode active material on a separate support and separating from the support, on the positive electrode current collector.

According to a further another embodiment of present invention, an electrochemical device including the positive electrode is provided. The electrochemical device may particularly be a battery or a capacitor, and may more particularly be a lithium secondary battery.

The lithium secondary batter may include a positive electrode, a negative electrode facing the positive electrode, a separator disposed between the positive electrode and the negative electrode, and an electrolyte. The positive electrode is the same as described above. In addition, the lithium secondary battery may further and selectively include a battery vessel receiving an electrode assembly of the positive electrode, the negative electrode, and the separator, and a sealing member for sealing the battery vessel.

In the lithium secondary battery, the negative electrode may include a negative electrode current collector, and a negative electrode active material layer disposed on the negative electrode current collector.

The negative electrode current collector may be any material that may not induce the chemical change of a battery and have high conductivity, without specific limitation, and may include, for example, copper, stainless steel, aluminum, nickel, titanium, baked carbon, a surface treated material of surface of copper or stainless steel with carbon, nickel, titanium, or silver, or an alloy of aluminum-cadmium. Generally, the negative electrode current collector may have a thickness from 3 to 500 µm, and the adhesiveness of the negative electrode active material may be reinforced by forming fine convexo-concave on the surface of the current collector as in the positive electrode current collector. For example, various shapes including a film, a sheet, a foil, a net, a porous body, a foamed body, a non-woven fabric body, etc. may be used.

The negative electrode active material layer may selectively include a binder and a conductive material together with the negative electrode active material. The negative electrode active material layer may be manufactured by, for example, applying a composition for forming a negative electrode including a negative electrode active material, and selectively a binder and a conductive material on a negative electrode current collector, and drying, or may be manufactured by laminating a film obtained by casting the composition for forming the negative electrode on a separate support and separating from the support, on the negative electrode current collector.

The negative electrode active material may be a compound capable of performing reversible intercalation and deintercalation of lithium. Particular examples may include a carbon material such as artificial graphite, natural graphite, graphitized carbon fiber, and amorphous carbon; a metallic compound capable of forming an alloy with lithium such as Si, Al, Sn, Pb, Zn, Bi, In, Mg, Ga, Cd, an Si alloy, an Sn alloy, or an Al alloy; a metal oxide capable of doping and dedoping lithium such as $SiO_x$ (0<x<2), $SnO_2$, vanadium oxide, and lithium vanadium oxide; a composite including the metallic compound and the carbon material such as an Si—C composite or an Sn—C composite, and a mixture of two or more thereof may be used. In addition, a metal lithium thin film may be used as the negative electrode active material. As the carbon material, both carbon with low crystallinity and carbon with high crystallinity may be used. The carbon with low crystallinity may typically include soft carbon and hard carbon, and the carbon with high crystallinity may typically include amorphous, platy, scaly, spherical or fibrous natural graphite or artificial graphite, and baked carbon at high temperatures such as kish graphite, pyrolytic carbon, mesophase pitch based carbon fiber, meso-carbon microbeads, mesophase pitches, and petroleum or coal tar pitch derived cokes.

The binder and the conductive material may be the same as those illustrated in the description of the positive electrode.

Meanwhile, the separator in the lithium secondary battery separates a negative electrode and a positive electrode and provides a transport path of lithium ions. The separator may be any one used in a common lithium secondary battery, without specific limitation, and particularly, a separator having low resistance to the ion transport in an electrolyte and good impregnation capacity of the electrolyte may be preferable. Particularly, a porous polymer film, for example, a porous polymer film prepared using a polyolefin-based polymer such as an ethylene homopolymer, a propylene homopolymer, an ethylene/butene copolymer, an ethylene/hexene copolymer, and an ethylene/methacrylate copolymer, or a layered structure of two or more thereof may be used. In addition, a commonly used porous non-woven fabric, for example, a non-woven fabric formed using a glass fiber having a high melting point, a polyethylene terephthalate fiber, etc. may be used. Further, a coated separator including a ceramic component or a polymer material may be used for securing heat resistance or mechanical strength, and a single layer structure or a multilayer structure may be selectively used.

As the electrolyte used in the present invention, an organic liquid electrolyte, an inorganic liquid electrolyte, a solid polymer electrolyte, a gel type polymer electrolyte, a solid inorganic electrolyte, a melting inorganic electrolyte, etc. may be used, without limitation.

Particularly, the electrolyte may include an organic solvent and a lithium salt.

As the organic solvent, any solvent that may play the role of a medium for transporting ions participating in the electrochemical reaction of a battery may be used, without specific limitation. Particularly, the organic solvent may include an ester-based solvent such as methyl acetate, ethyl acetate, γ-butyrolactone, and ε-caprolactone; an ether-based solvent such as dibutyl ether, and tetrahydrofuran; a ketone-based solvent such as cyclohexanone; an aromatic hydrocarbon-based solvent such as benzene, and fluorobenzene; a carbonate-based solvent such as dimethyl carbonate (DMC), diethyl carbonate (DEC), methyl ethyl carbonate (MEC), ethyl methyl carbonate (EMC), ethylene carbonate (EC), and propylene carbonate (PC); an alcohol-based solvent such as ethyl alcohol, and isopropyl alcohol; nitriles such as R-CN (where R is C2-C20 linear, branched or cyclic structure of hydrocarbon group and may include a double bond aromatic ring or an ether bond); amides such as dimethyl formamide; dioxolanes such as 1,3-dioxolane; or sulfolanes. Among the solvents, the carbonate solvent is preferable, and a mixture of a cyclic carbonate having high ion conductivity and high dielectricity capable of improving charge discharge performance of the battery (for example, ethylene carbonate or propylene carbonate) and a linear carbonate compound having a low viscosity (for example, ethyl methyl carbonate, dimethyl carbonate, or diethyl carbonate) is more preferable. In this case, the cyclic carbonate and linear carbonate may be mixed in a volume ratio from about 1:1 to about 1:9 for attaining good electrolyte performance.

The lithium salt may be any compound capable of providing lithium ions used in a lithium secondary battery, without specific limitation. Particularly, the lithium salt may include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, LiCl, LiI, or $LiB(C_2O_4)_2$. The concentration of the lithium salt may be within a range from 0.1 to 2.0 M. If the concentration of the lithium salt is in the range, an electrolyte may have an appropriate conductivity and viscosity, thereby providing good electrolyte performance and effective transport of lithium ions.

In the electrolyte, at least one additive such as a haloalkylene carbonate-based compound such as difluoroethylene carbonate, pyridine, triethyl phosphite, triethanolamine, cycle ether, ethylenediamine, n-glyme, hexaphosphoric acid triamide, nitrobenzene derivatives, sulfur, a quinone imine dye, N-substituted oxazolidinone, N,N-substituted imidazolidine, ethylene glycol dialkyl ether, an ammonium salt, pyrrole, 2-methoxyethanol, or trichloroaluminum other than the components of the electrolyte in order to improve the life property of a battery, to restrain the capacity decrease of a battery, to improve the discharge capacity of a battery. The additive may be included in an amount ratio from 0.1 to 5 wt % relative to the total weight of the electrolyte.

A lithium secondary battery including the positive electrode active material according to the present invention has good discharge capacity and output property, and stable capacity maintenance rate, and may be usefully used in a portable device such as a cellular phone, a laptop computer, and a digital camera, and an electric vehicle field including a hybrid electric vehicle (HEV), etc.

According to another aspect of the present invention, there are provided a battery module including the lithium secondary battery as a unit cell and a battery pack including the battery module.

The battery module or the battery pack may be used as a power source of at least one medium and large size device of power tools; electric vehicles such as an electric vehicle (EV), a hybrid electric vehicle, and a plug-in hybrid electric vehicle (PHEV); or an energy storage system.

Hereinafter, the present invention will be explained in more detail referring to the following examples. However, the examples may include various different modifications, and the scope of the present invention is not limited thereto.

PREPARATION EXAMPLE 1

Preparation of Positive Electrode Active Material

A $Li_2CO_3$ powder and a $Co_3O_4$ powder were mixed in certain amounts such that a Li/Co molar ratio was 1.02, followed by first heating at 750° C. for 20 hours to prepare first lithium cobalt oxide.

0.04 parts by weight of a Ti powder as a surface treating agent relative to 100 parts by weight of the first lithium cobalt oxide thus prepared was mixed therewith, followed by second heating at 900° C. for 20 hours to prepare a positive electrode active material (Average particle diameter: 12 μm) including a surface modifying layer on the surface of the first lithium cobalt oxide particle.

PREPARATION EXAMPLE 2

Preparation of Positive Electrode Active Material

A positive electrode active material was prepared by conducting the same procedure described in Preparation Example 1 except for using 0.25 parts by weight of a P powder as the surface treating agent relative to 100 parts by weight of the lithium cobalt oxide.

PREPARATION EXAMPLE 3

Preparation of Positive Electrode Active Material

A positive electrode active material was prepared by conducting the same procedure described in Preparation Example 1 except for using 0.3 parts by weight of $Mn(OH)_2$ as the surface treating agent relative to 100 parts by weight of the lithium cobalt oxide.

PREPARATION EXAMPLE 4

Preparation of Positive Electrode Active Material

A positive electrode active material was prepared by conducting the same procedure described in Preparation Example 1 except for using 0.05 parts by weight of $Al_2O_3$ as the surface treating agent relative to 100 parts by weight of the lithium cobalt oxide.

PREPARATION EXAMPLE 5

Preparation of Positive Electrode Active Material

A $Li_2CO_3$ powder and a $Co_3O_4$ powder were dry mixed in certain amounts such that a Li/Co molar ratio was 1, and additionally, a $W_2O_3$ powder was added and mixed in a certain amount such that the amount of a W metal was 0.001 mol relative to 1 mol of Li, followed by first heating at 900° C. for 20 hours. The powder thus obtained was ground and classified to prepare first lithium cobalt oxide particles.

A positive electrode active material (Average particle diameter: 12 μm) including a surface modifying layer on the surface of the first lithium cobalt oxide particle was prepared by conducting the same procedure described in Preparation Example 1 except for using the first lithium cobalt oxide particles thus prepared.

EXAMPLES 1 to 5

Manufacture of Lithium Secondary Batteries

Lithium secondary batteries were manufactured using each positive electrode active material prepared in Preparation Examples 1 to 5.

In detail, each positive electrode active material prepared in Preparation Examples 1 to 5, a carbon black conductive material, and a PVdF binder were mixed in an N-methyl pyrrolidone solvent in a weight ratio of 90:5:5 to prepare a composition (Viscosity: 5,000 mPa·s) for forming a positive electrode. The composition was applied on an aluminum current collector, dried, and rolled to manufacture a positive electrode.

Mesocarbon microbead (MCMB) which is artificial graphite as a negative electrode active material, a carbon black conductive material, and a PVdF binder were mixed in an N-methyl pyrrolidone solvent in a weight ratio of 85:10:5 to prepare a composition for forming a negative electrode. The composition was applied on a copper current collector to manufacture a negative electrode.

An electrode assembly was manufactured by disposing a porous polyethylene separator between the positive electrode and the negative electrode, and the electrode assembly was positioned in a case. An electrolyte was injected into the case to manufacture a lithium secondary battery. In this case, the electrolyte was prepared by dissolving 1.15 M concentration of lithium hexafluorophosphate ($LiPF_6$) in an organic solvent including ethylene carbonate (EC)/dimethyl carbonate (DMC)/ethyl methyl carbonate (EMC) (Volume ratio of EC/DMC/EMC=3/4/3).

COMPARATIVE EXAMPLE 1

Manufacture of Lithium Secondary Battery

A lithium secondary battery was manufactured by conducting the same procedure described in Example 1 except for using $LiCoO_2$ (Average particle diameter: 12 μm) as the positive electrode active material.

COMPARATIVE EXAMPLE 2

Manufacture of Lithium Secondary Battery $LiCoO_2$ was immersed in a slurry prepared by dissolving $Li_2TiO_3$ in NMP, dried, and heated at 350° C. to prepare a $LiCoO_2$-based negative electrode active material (Average particle diameter: 12 μm) including a $Li_2TiO_3$ coating layer on the surface thereof in an amount ratio of 0.001 parts by weight on the basis of Ti concentration.

A lithium secondary battery was manufactured by conducting the same procedure described in Example 1 except for using the negative electrode active material thus prepared.

EXPERIMENTAL EXAMPLE 1

For the positive electrode active material prepared in Preparation Example 1, the molar ratio change of Li/Co was observed according to a depth profile from the surface to the inner part of an active material particle using TEM and EDS. The results are shown in the following Table 1.

TABLE 1

| Depth from the surface of positive electrode active material particle (nm) | Li/Co molar ratio |
|---|---|
| 20 | 0.98 |
| 40 | 1.0 |
| 60 | 1.02 |
| 100 | 1.0 |
| 1,000 | 1.0 |
| 2,000 | 1.0 |
| 3,000 | 1.0 |
| 4,000 | 1.0 |
| 5,000 | 1.0 |
| 6,000 (particle center) | 1.0 |

As shown in Table 1, in the particles of the positive electrode active material prepared in Preparation Example 1, a surface modifying layer including lithium deficient second lithium cobalt oxide of which Li/Co ratio was less than 1 was formed in a region from the surface of the particle to the depth of less than 40 nm, and a core including first lithium cobalt oxide of which Li/Co ratio was 1 or more was formed therein. In addition, it would be confirmed that the lithium cobalt oxide was included in a shell region with a gradually increasing concentration gradient of the Li/Co molar ratio from the surface to the center of the positive active material particle.

EXPERIMENTAL EXAMPLE 2

The lithium distribution in the surface side of the particle in the positive electrode active material particles prepared in Preparation Example 1 was observed using an atom probe tomography (APT). The results are shown in FIG. 1.

In FIG. 1, a) is a photographic image of lithium distribution in the surface side of the lithium cobalt oxide particle (to 50 nm from the surface to the center of the particle) of Preparation Example 1 observed by APT, and b) is a photographic image obtained by projecting 3D information in a) into 2D for measuring density.

As shown in FIG. 1, it would be confirmed that the density of lithium in the surface of the positive electrode active material was lower than that in the center of the particle.

EXPERIMENTAL EXAMPLE 3

The kind of the lithium compound produced in the surface modifying layer and the amount of the reactive element with lithium were identified via TEM-EDS analysis on the positive electrode active materials prepared in Preparation Examples 1 to 4. The results are shown in the following Table 2.

TABLE 2

| | Kind of lithium compound produced in surface modifying layer | Amount of reactive element with lithium (ppm) |
|---|---|---|
| Preparation Example 1 | Li$_2$TiO$_3$, Li$_4$Ti$_5$O$_{12}$ | 350 |
| Preparation Example 2 | Li$_3$PO$_4$ | 2,300 |
| Preparation Example 3 | Li$_2$MnO$_3$, LiMn$_2$O$_4$ | 3,000 |
| Preparation Example 4 | LiAlO$_2$ | 450 |

EXPERIMENTAL EXAMPLE 4

The crystal structures of the first lithium cobalt oxide forming the core and the lithium deficient second lithium cobalt oxide included in the surface modifying layer in the positive electrode active material prepared in Preparation Example 1 were observed, respectively, using Transmission electron diffraction spectrometry. The results are shown in FIG. 2.

Figure 2:
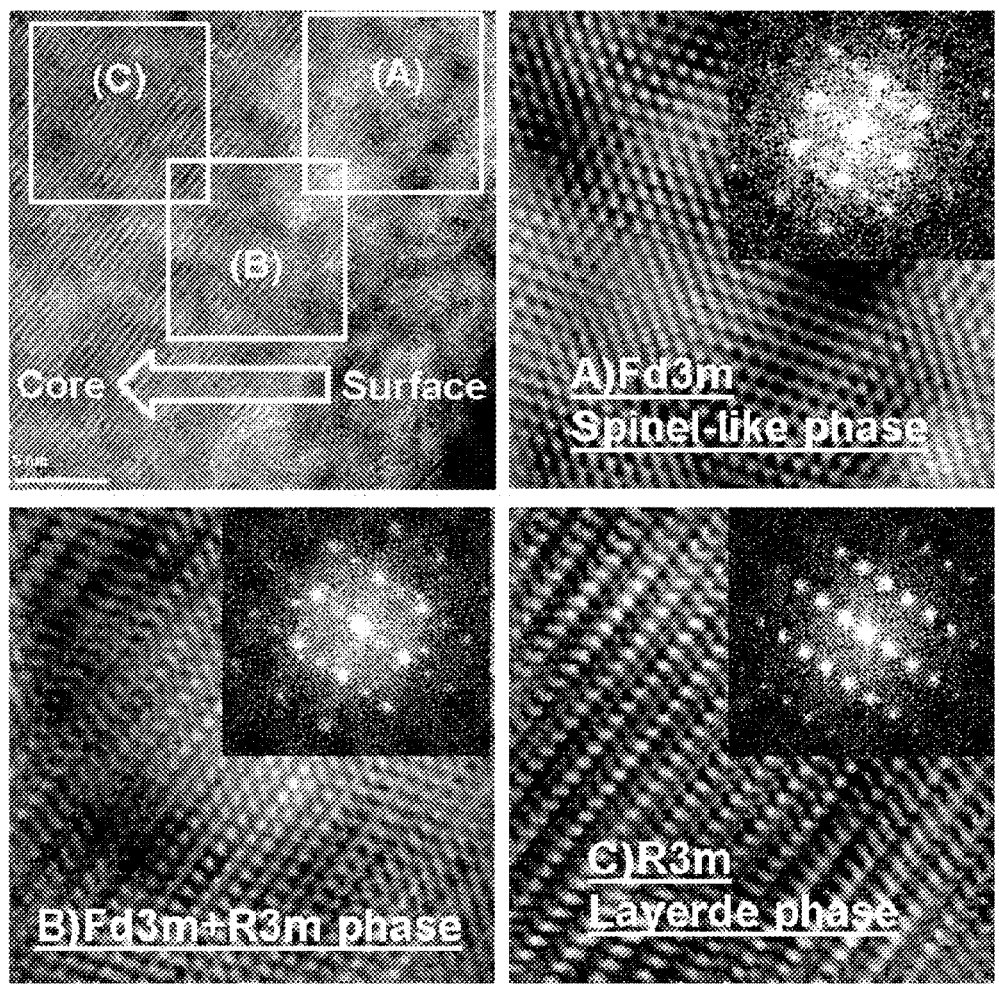
FIG. 2 illustrates photographic images for observing the crystal structure of lithium cobalt oxide particle prepared in Preparation Example 1 using a transmission electron microscopy (TEM)

As shown in FIG. 2, the first lithium cobalt oxide forming the core showed a layered structure of an R_3m space group, and the second lithium cobalt oxide present at the surface of the first lithium cobalt oxide particles was identified to have a cubic crystal structure of an Fd-3m space group like a spinel crystal structure.

EXPERIMENTAL EXAMPLE 5

Coin cells (using a Li metal negative electrode) were manufactured using the positive electrode active materials prepared in Preparation Example 1 and Comparative Example 1, and conducted charged and discharged under the conditions of room temperature (25° C.) and 0.1 C/0.1 C. Then, initial charge and discharge properties were evaluated, and the results are shown in FIG. 3.

Figure 3:
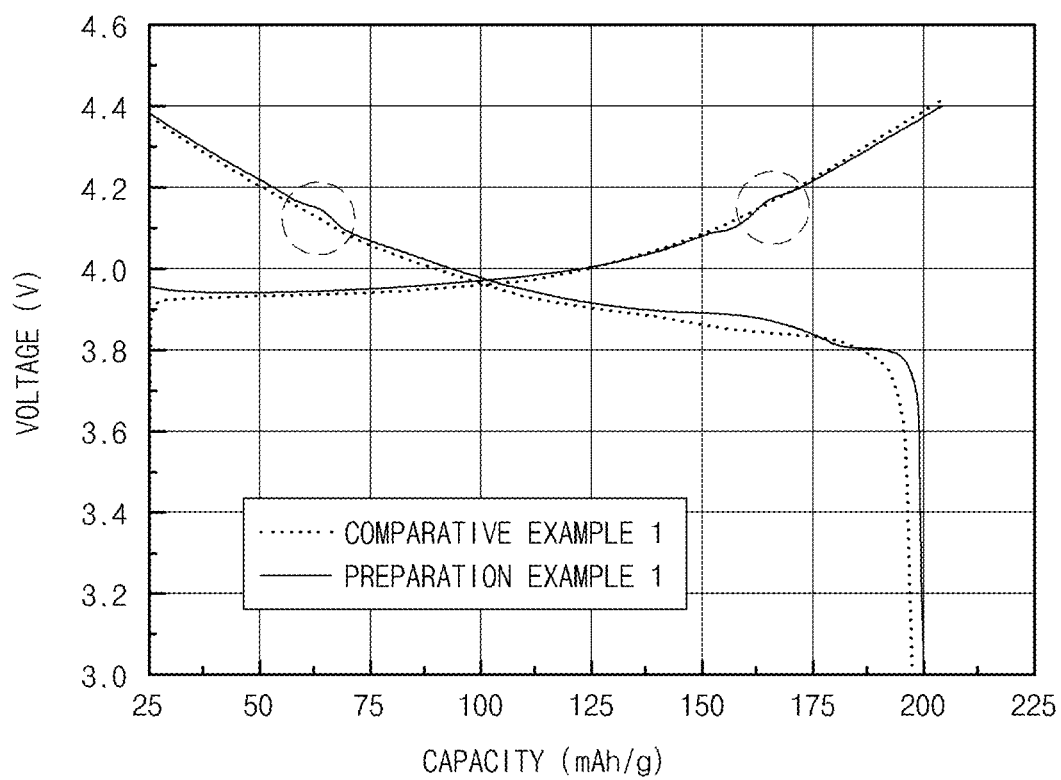
FIG. 3 is a graph illustrating initial charge and discharge properties during charging and discharging for lithium secondary batteries including each positive electrode active materials prepared in Preparation Example 1 and Comparative Example 1.

From the experimental results, as shown in FIG. 3, the positive electrode active material of Preparation Example 1, including a surface modifying layer including the second lithium cobalt oxide having a lithium deficient structure on the surface of the first lithium cobalt oxide particle illustrates almost equal degree of initial charge and discharge properties when compared to the positive electrode active material of LiCoO$_2$ without a lithium deficient structure according to Comparative Example 1. However, the bending of a voltage profile, that is, an inflection point was observed between 4.05 to 4.15 V during initial charging and discharging due to the lithium deficient structure present in the particle for the positive electrode active material of Preparation Example 1 (Refer to circular portions with broken lines in FIG. 3).

EXPERIMENTAL EXAMPLE 6

Figure 4:
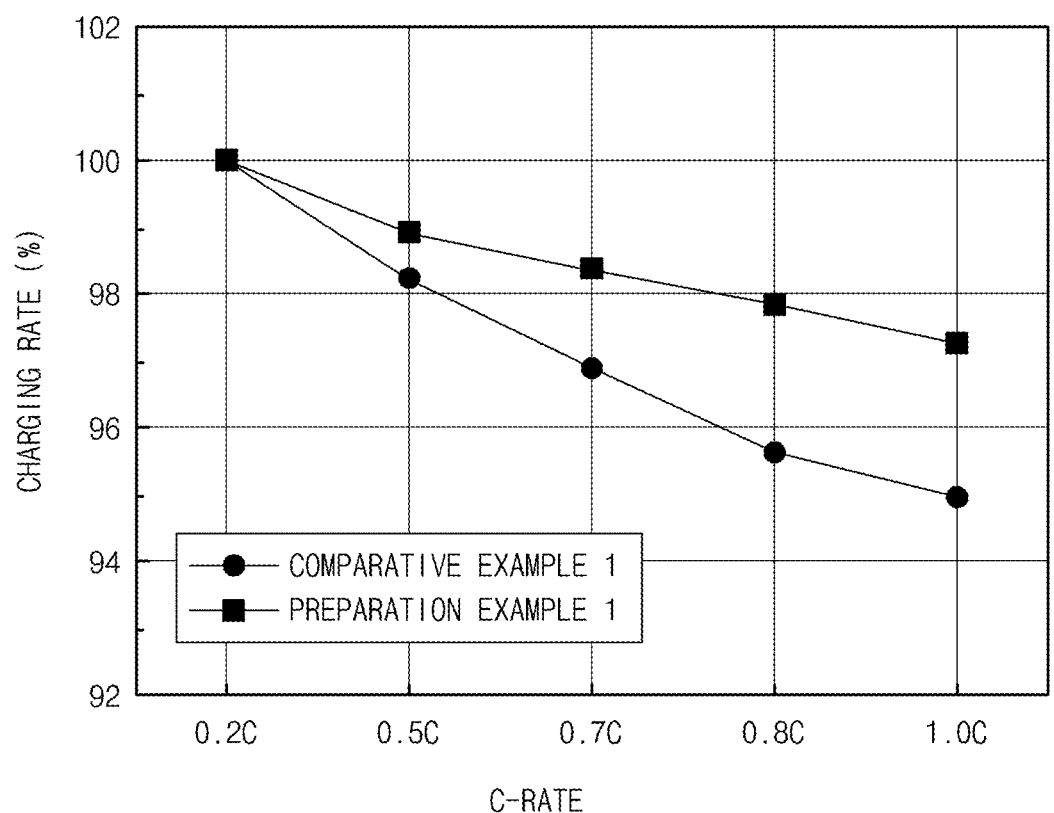
FIG. 4 is a graph illustrating rate property during charging and discharging for lithium secondary batteries including each positive electrode active materials prepared in Preparation Example 1 and Comparative Example 1.

Coin cells (using a Li metal negative electrode) were manufactured using the positive electrode active materials prepared in Preparation Example 1 and Comparative Example 1, rate characteristic was measured during charging and discharging under the conditions of room temperature (25° C.) and 0.1 C/0.1 C, and the results are shown in FIG. 4.

As shown in FIG. 4, a lithium secondary battery including the positive electrode active material of Preparation Example 1, including the second lithium cobalt oxide having a lithium deficient structure on the surface of the first lithium cobalt oxide particle, showed improved rate characteristic when compared to the lithium secondary battery of Comparative Example 1 including the positive electrode active material of LiCoO$_2$ without a lithium deficient structure.

EXPERIMENTAL EXAMPLE 7

The battery properties of the lithium secondary batteries manufactured in Examples 1 to 4 and Comparative Examples 1 and 2 were evaluated by the following method.

In detail, for lithium secondary batteries manufactured in Examples 1 to 4 and Comparative Examples 1 and 2, rate characteristic during charging and discharging was measured at room temperature (25° C.) within a driving voltage from 3 V to 4.4 V under the conditions of 2 C/0.1 C, and cycle capacity retention which is the ratio of a discharge capacity at $50^{th}$ cycle with respect to an initial capacity, was measured respectively after charging and discharging for 50 cycles at a high temperature (45° C.) within a driving voltage range from 3 V to 4.4 V under the conditions of 0.5 C/1 C. The results are shown in the following Table 3.

TABLE 3

| | Rate characteristic (2 C/0.1 C, %) at room temperature (25° C.) | $50^{th}$ cycle capacity retention (%) at high temperature (45° C.) |
|---|---|---|
| Comparative Example 1 | 92.5 | 95.1 |
| Comparative Example 2 | 92.2 | 95.5 |
| Example 1 | 94.9 | 96.9 |
| Example 2 | 95.0 | 97.5 |
| Example 3 | 94.2 | 96.7 |
| Example 4 | 94.0 | 98.3 |

From the experimental results, the batteries of Examples 1 to 4 including positive electrode active materials having a lithium deficient structure in the surface of the particle showed improved cycle property when compared to the battery of Comparative Example 1 including a lithium cobalt oxide without the lithium deficient structure as the positive electrode active material and when compared to the battery of Comparative Example 2 including a positive electrode active material having an Li$_2$TiO$_3$ coating layer without a lithium deficient structure on the surface thereof.

The invention claimed is:
1. A positive electrode active material for a lithium secondary battery, comprising:
 a core comprising a first lithium cobalt oxide; and
 a surface modifying layer positioned on a surface of the core,
 wherein the surface modifying layer comprises:
  a lithium compound discontinuously distributed on the surface of the core; and
  a second lithium cobalt oxide distributed while making a contact with or adjacent to the lithium compound, the second lithium cobalt oxide having a LiCo molar ratio of less than 1,
 wherein the lithium compound comprises at least one lithium reactive element selected from the group consisting of Ti, W, Zr, Mn, Mg, P, Ni, Al, Sn, V, Cr, and Mo.
2. The positive electrode active material for a lithium secondary battery of claim 1, wherein the lithium reactive element is included in an amount ratio from 50 ppm to 50,000 ppm relative to a total weight of the positive electrode active material.

3. The positive electrode active material for a lithium secondary battery of claim 1, wherein the lithium compound comprises at least one selected from the group consisting of $Li_2TiO_3$, $Li_4Ti_5O_{12}$, $Li_3PO_4$, $Li_2MnO_3$, $LiMn_2O_4$, and $LiAlO_2$, or a mixture of two or more thereof.

4. The positive electrode active material for a lithium secondary battery of claim 1, wherein the lithium compound is distributed in an island shape on the surface of the core.

5. The positive electrode active material for a lithium secondary battery of claim 1, wherein the first lithium cobalt oxide comprises a compound of the following Formula 1, and the second lithium cobalt oxide comprises a compound of the following Formula 2:

$$Li_aCoM_xO_2 \quad \text{[Formula 1]}$$

$$Li_{1-b}CoM'_yO_2 \quad \text{[Formula 2]}$$

(in Formula 1 and 2, M and M' each independently comprises at least one metal element selected from the group consisting of W, Mo, Zr, Ti, Mg, Ta, Al, Fe, V, Cr, and Nb, and a, b, x, and y satisfy the following relations of $1 \leq a \leq 1.2$, $0 \leq b \leq 0.05$, $0 \leq x \leq 0.02$ and $0 \leq y \leq 0.02$).

6. The positive electrode active material for a lithium secondary battery of claim 1, wherein the first lithium cobalt oxide has a layered crystal structure, and the second lithium cobalt oxide belongs to an Fd-3m space group and has a cubic crystal structure.

7. The positive electrode active material for a lithium secondary battery of claim 5, wherein
a concentration of lithium in the core is higher than a concentration of lithium included in the surface modifying layer,
the lithium is distributed with a gradually increasing concentration gradient from an interface of the core and the surface modifying layer to a center of the core, and in Formula 1, a increases toward the center of the core within a range of $1 \leq a \leq 1.2$.

8. The positive electrode active material for a lithium secondary battery of claim 1, wherein
a concentration of lithium in the core is higher than a concentration of lithium included in the surface modifying layer, and
the lithium has one concentration value in each region of the core and the surface modifying layer.

9. The positive electrode active material for a lithium secondary battery of claim 1, wherein the core and the surface modifying layer have a thickness ratio from 1:0.01 to 1:0.1.

10. The positive electrode active material for a lithium secondary battery of claim 1, comprising a monolith structure having an average particle diameter (D50) from 3 to 50 μm.

11. The positive electrode active material for a lithium secondary battery of claim 1, having an inflection point is within a voltage range from 4.0 V to 4.2 V when measuring a voltage profile when charging and discharging.

12. A positive electrode for a lithium secondary battery, the positive electrode comprising the positive electrode active material according to claim 1.

13. A lithium secondary battery comprising the positive electrode of claim 12.

14. A battery module comprising the lithium secondary battery of claim 13 as a unit cell.

15. A battery pack comprising the battery module of claim 14.

16. The battery pack of claim 15, wherein the battery pack is used as a power source of a medium and large size device.

17. The battery pack of claim 16, wherein the medium and large size device is selected from the group consisting of an electric vehicle, a hybrid electric vehicle, a plug-in hybrid electric vehicle, and an energy storage system.

* * * * *